United States Patent [19]

Pav et al.

[11] 4,290,353
[45] Sep. 22, 1981

[54] ROLL FOR CALENDERS OR THE LIKE

[75] Inventors: Josef Pav, Krefeld; Josef Pav, Munich, both of Fed. Rep. of Germany

[73] Assignee: Kleinewefers GmbH, Krefeld, Fed. Rep. of Germany

[21] Appl. No.: 97,961

[22] Filed: Nov. 28, 1979

[30] Foreign Application Priority Data

Nov. 30, 1978 [DE] Fed. Rep. of Germany ....... 2851747

[51] Int. Cl.³ .............................................. B30B 3/04
[52] U.S. Cl. ................................. 100/162 B; 100/47; 100/168; 29/116 AD; 101/23; 101/216; 72/56; 72/232
[58] Field of Search .................. 100/163 R, 168, 169, 100/162 B, 47, DIG. 17; 29/116 R, 116 AD; 308/10; 101/382 MV, 23–25, 216; 72/56, 199, 232

[56] References Cited

U.S. PATENT DOCUMENTS

| | | | |
|---|---|---|---|
| 2,908,964 | 10/1959 | Appenzeller | 29/116 AD |
| 3,413,915 | 12/1968 | Goodwin et al. | 100/DIG. 17 |
| 3,456,582 | 7/1969 | McClenathan | 100/DIG. 17 |
| 3,489,079 | 1/1970 | Aurich et al. | 100/168 |
| 4,062,097 | 12/1977 | Riihinen | 29/116 AD |

*Primary Examiner*—Peter Feldman
*Attorney, Agent, or Firm*—Peter K. Kontler

[57] ABSTRACT

A roll which can be used in a calender to bear upon a web of textile material, paper or the like while the web travels between the peripheral surface of a floating shell of the roll and a counterroll. The shell surrounds a non-rotatable shaft which carries several rows of discrete electromagnets extending in parallelism with the axis of the shaft and along an arc of at least 200 degrees, as considered in the circumferential direction of the shaft. The electromagnets can be energized to a different extent so as to subject the magnetizable material of the shell to forces of different magnitude and to thus counteract the tendency of the shell to undergo deformation in response to the action of forces which act radially of the shell or which tend to impart to the shell vibratory movements. Additional electromagnets can be provided to cooperate with a radially inwardly extending flange at one end of the shell to hold the latter against excessive movements from an optimum axial position.

35 Claims, 8 Drawing Figures

ROLL FOR CALENDERS OR THE LIKE

BACKGROUND OF THE INVENTION

The present invention relates to rolls which can be used to transport and/or to otherwise treat sheet-like materials. Typical examples of rolls to which the present invention pertains are the rolls (or at least certain rolls) of calenders, embossing devices and similar machines wherein two or more rolls cooperate to subject a web of paper textile, synthetic plastic or other material to compressive and/or other stresses in order to improve its finish, consistency, appearance and/or other characteristics.

More particularly, the invention pertains to improvements in rolls for use in calenders or the like wherein a hollow cylindrical shell or sleeve surrounds a stationary carrier (normally an elongated shaft) and at least a portion of the shell consists of magnetizable material. The carrier supports one or more electromagnets which can be energized so as to cause the shell to float around the carrier. The pole faces of the electromagnets are directed toward an air gap between the internal surface of the shell and the carrier, and the roll further comprises means for applying to the electromagnets an exciting current in order to maintain the shell in a state of contact-free suspension with respect to the stationary carrier.

In a conventional roll of the above outlined character (which is used to apply pressure to flexible materials by cooperating with a counterroll), a electromagnet with two pole faces is installed in the interior of the shell opposite the nip of the two rolls. It is also known to replace such single electromagnet with a plurality of electromagnets which are connected in series. The exciting current is regulatable in order to change the pressure between the peripheral surface of the shell and the peripheral surface of the counterroll. The pole faces of the electromagnet or electromagnets extend along an arc of not more than 180 degrees and normally not in excess of approximately 90 degrees (as considered in the circumferential direction of the stationary carrier for the floating shell of the roll). The compensating means for eventual flexing of the shell includes adjustable bracing means which engages the carrier for the electromagnet(s). The end portions of the shell are mounted in bearings which are independent of or distinct from the carrier.

It is further known to construct a calender roll in such a way that the shell surrounds a stationary carrier for a series of hydrostatic supporting devices each of which establishes and maintains a cushion of pressurized fluid. The pressure of fluid in individual cushions can be regulated to thereby compensate for the tendency of certain portions of the shell to flex as a result of the action of various forces that develop in the course of a calendering operation. Regulation of pressure in the cushions can be carried out separately for each and every cushion or for groups of two or more cushions. The purpose of hydrostatic supporting devices is to insure that the pressure which the roll and the associated counterroll exert upon a web of sheet-like material is constant all the way along the full length of the nip of such rolls. The just described roll failed to gain widespread acceptance in the industry because it is very expensive and prone to malfunction. Friction between the liquid medium and the surface of the shell causes additional losses of available pressure and complicates the regulating operation.

When the hollow shell of the aforediscussed conventional roll is subjected to a very pronounced pressure which is applied by the counterroll, or when the shell is subjected to pronounced stresses under the action of the material which is treated in a machine (such as a calender) wherein the roll with a floating shell is put to use, the shell is likely to undergo a deformation which imparts thereto a substantially elliptical cross-sectional outline. Such deformation is especially likely to occur if the wall thickness of the shell is not very pronounced. On the other hand, manufacturers of calenders or like machines attempt to use shells with relatively thin walls in order to save material as well as to reduce the overall weight (this is especially important when the rolls of a calender are very long). Excessive deformation of the roll is not permissible in any of a number of various machines, such as calenders, smoothing devices, embossing devices, transporting and guiding devices for paper, sheet-like textile and/or synthetic plastic materials. Analogous problems arise as a result of excessive deformation of rolls in printing machines, rolling mills in steel plants and similar establishments wherein the material is grasped, transported, compressed and/or otherwise treated by two or more rolls during travel through the nips of neighboring rolls. For example, when the roll is used in a calender and its shell undergoes a certain amount of deformation, a web of paper or the like which passes through the nip of the roll with a counterroll is subjected to a greatly reduced pressure because, instead of being in mere linear contact with the peripheral surface of the shell and with the peripheral surface of the counterroll, the material is in substantial surface-to-surface contact with the shell as well as with the counterroll. This, in turn, entails a great reduction of pressure upon successive increments of the material. Such reduction of pressure can greatly affect the quality, appearance and/or other characteristics of a running web of paper or the like. Another drawback of the just discussed deformation of the shell is that it is not uniform along the full length of the nip of the shell with the counterroll. Therefore, the material of a web which is caused to run through the nip of the two rolls is streaky, i.e., a longitudinally extending stretch having first characteristics is adjacent to a longitudinally extending stretch whose characteristics are quite different.

A similar situation arises when a shell of the aforediscussed character is used in a guide roll wherein the web of running material is under tension and surrounds a substantial part of the peripheral surface of the shell. Furthermore, the shells of relatively long rolls which serve to transmit torque are often flexed as a result of the development of a reaction force which acts at right angles to the direction of pressure between the roll and the counterroll. This, too, influences the configuration of the gap between the two rolls and adversely affects the quality of treatment to which the running web is subjected. Eventual imbalance of the shell (such imbalance is likely to arise if the shell is deformed) or pronounced unevenness of the material of the running web (i.e., changes or fluctuations in such physical characteristics as thickness, density, composition, surface finish and/or others) can generate vibrations which initiate periodical changes in the configuration of the shell, either at certain points or along the full length of the roll.

OBJECTS AND SUMMARY OF THE INVENTION

An object of the invention is to provide a novel and improved roll which can be used in a calender, a rolling mill or a similar machine as a superior substitute for heretofore known rolls of the above outlined character wherein a shell spacedly surrounds a stationary carrier of electromagnets.

Another object of the invention is to provide the roll with novel and improved means for preventing or reducing the likelihood of deformation of the external surface of the shell.

A further object of the invention is to provide a roll which can be installed in many existing machines as a superior substitute for heretofore known rolls.

An additional object of the invention is to provide the roll with novel and improved means for counteracting a variety of deforming forces which act upon the shell, including those forces which arise periodically and whose magnitude fluctuates within an extremely wide range.

Another object of the invention is to provide a roll wherein the shell can be maintained in a predetermined position, as considered radially as well as axially of its carrier.

A further object of the invention is to provide a roll with novel and improved means for stabilizing the position and configuration of its shell.

The invention is embodied in a calender or a like machine, and more particularly in a roll which comprises a non-rotatable elongated carrier (e.g., a horizontal shaft), a rotary cylindrical sleeve or shell which spacedly surrounds the carrier and consists, at least in part, of magnetizable material, and means for causing the shell to float about the carrier. The means for causing the shell to float comprises at least three groups of electromagnet means mounted on the carrier within the confines of the shell and having pole faces extending along an arc of at least 200 degrees and preferably along an arc of at least 270 degrees, as considered in the circumferential direction of the carrier, and means for regulating the extent of excitement or energization of each of the electromagnet means independently of the other electromagnet means. Each electromagnet means may comprise a full row of discrete electromagnets which may extend between the two ends of the shell. The magnetizable material forms at least one layer of the shell, as considered in the circumferential direction of the roll. In other words, the shell may but need not consist of magnetizable material all the way from its internal surface to its periphery or vice versa. When the electromagnet means (or at least certain electromagnet means) are energized, the shell and the pole faces of the electromagnet means define an air gap which can be partially filled with a fluid tempering agent, e.g., a heating liquid which is confined between two barriers. Such barriers may constitute spring-biased elements which are supported by the carrier and are urged outwardly against the internal surface of the shell. If the fluid tempering agent can be influenced by magnetic forces, the barriers may be formed by magnetic fields.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
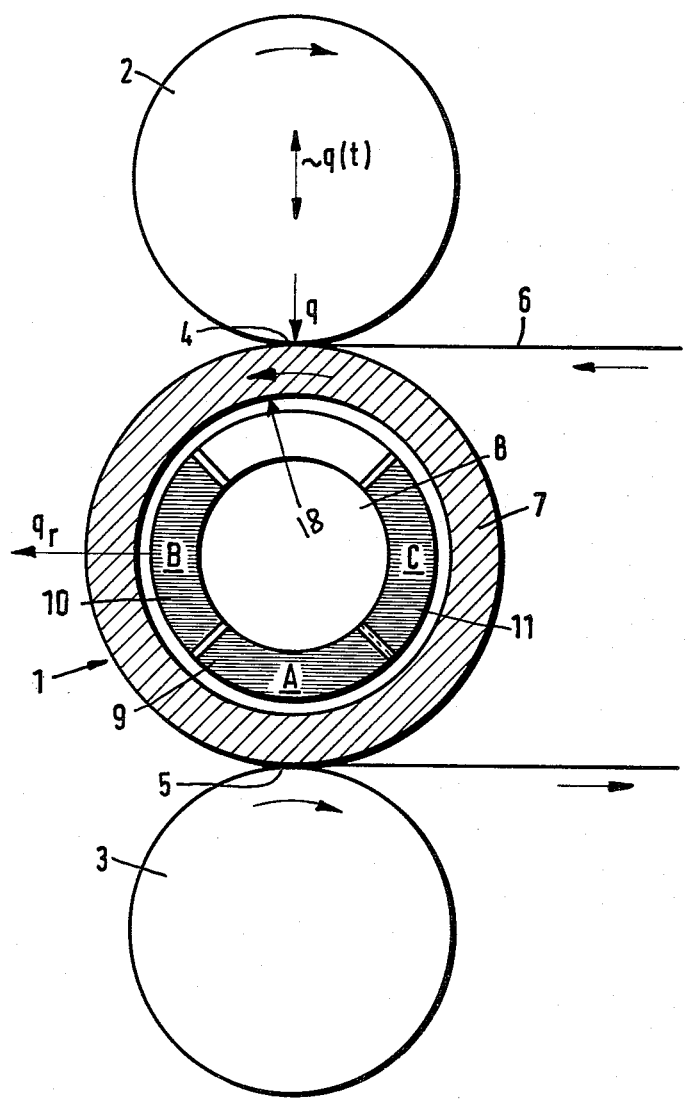
FIG. 1 is a schematic transverse sectional view of a roll which enbodies one form of the invention and cooperates with two counterrolls.

Referring first to FIG. 1, there is shown a set of three calender rolls including a centrally located median roll 1 and two counterrolls 2, 3. The counterroll 2 is located at a level above, and the counterroll 3 is located at a level below the roll 1 which latter is constructed and assembled in accordance with one feature of the present invention. The lower counterroll 3 rotates about a fixed axis in the frame of a calender, and the upper counterroll 2 is biased downwardly in a manner well known from the art of calenders and not specifically shown in the drawing. As a rule, the force which urges the counterroll 2 downwardly against the roll 1 is furnished by fluid operated means, such as one or more hydraulic cylinder and piston units.

The rolls 1, 2 and 3 may form part of a set of more than three rolls, e.g., of a set including up to or in excess of ten rolls which are superimposed upon each other. The vertical force which the counterroll 2 applies against the peripheral surface of the roll 1 is shown at q; such force can be supplied by the aforementioned means for urging the counterroll 2 downwardly, as well as by the weight of the counterroll 2, and acts substantially along a horizontal line in the nip 4 of the rolls 1 and 2. The force which the roll 1 applies to the lower counterroll 3 in the nip 5 of the rolls 1 and 3 equals the force q plus the weight of the roll 1. The pressure in the nips 4 and 5 is applied to a running web 6 of paper, textile or synthetic plastic material to impart to such material a certain structure or surface consistency.

The vertical force q tends to flex the cylindrical sleeve or shell 7 of the median roll 1, especially to flex the middle of the shell 7 in a downward direction. In addition, the force q tends to transmit to the shell 7 another deforming stress, namely, it tends to compress the shell 7 and to thereby impart thereto an elliptical cross-sectional outline. If the upper counterroll 2 is driven to thereby transmit torque to the rolls 1 and 3 as a result of frictional engagement between the rolls 2, 1 and 1, 3, there develops a reaction force $q_r$ which is normal to the direction of action of the vertical force but can also make an oblique angle therewith. The effect of the development of reaction force $q_r$ is that the middle of the shell 7 of the median roll 1 tends to flex in a direction to the left, as viewed in FIG. 1. The above-enumerated forces (plus other forces which will be explained below) tend to deform the nips 4 and 5 and to influence the nature of treatment of corresponding portions of the running web 6. Thus, the width of certain portions of the nip 4 and/or 5 increases or decreases whereby the pressure upon the corresponding portions of the running web decreases or increases.

The additional forces include the forces q(t) which are caused by vibration. The reasons for development of vibratory and similar stray movements of the rolls in a calender are numerous and their origin need not be described here. All that counts is to note that such forces do or can develop when a calender is in use and that the deforming stresses which are caused thereby are superimposed upon the deforming stresses caused by the forces q and $q_r$. The stresses which are caused by the forces q(t) develop periodically and induce intermittent deformation of the shell 7 of the median roll 1.

Figure 2:
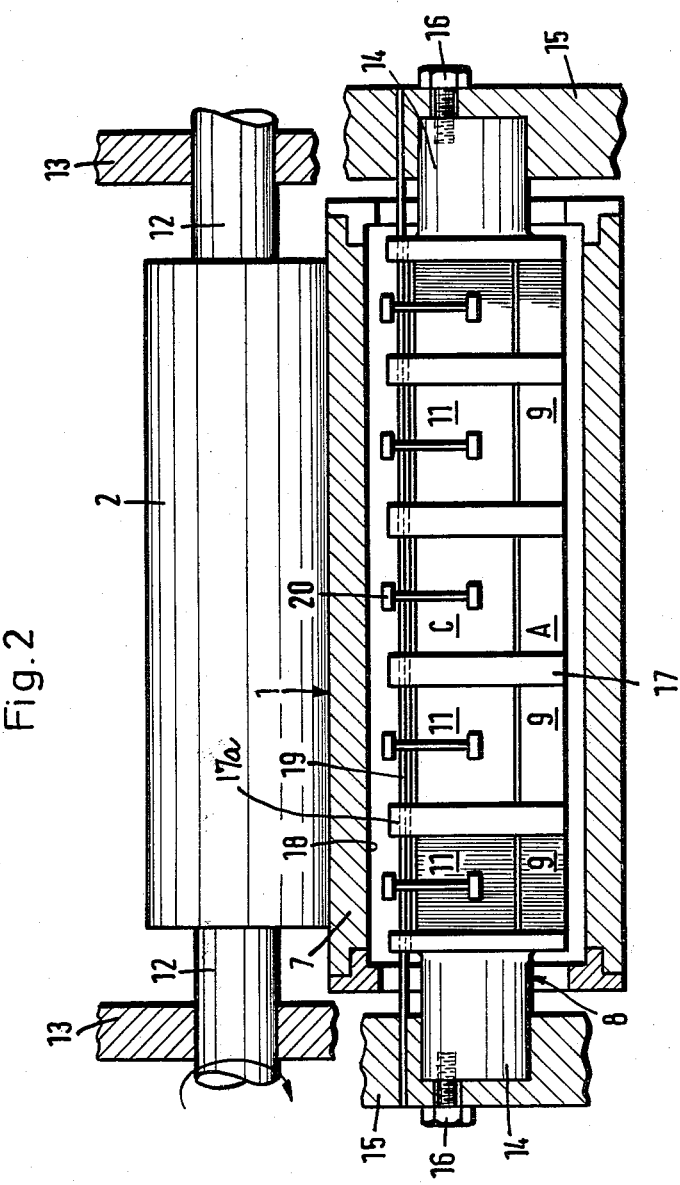
FIG. 2 is a schematic axial sectional view of the roll which is shown in section in FIG. 1, and further showing the upper counterroll of FIG. 1.

The internal surface 18 of the shell 7 spacedly surrounds a normally stationary non-rotatable carrier here shown as an elongated shaft 8 whose end portions or trunnions 14 are secured to holders or bearings 15 by screws 16 or analogous fasteners (see FIG. 2). The bearings 15 form part of or are vertically movably installed in the frame of the calender. The shaft 8 supports three groups or rows A, B and C of schematically indicated electromagnets 9, 10, 11. These electromagnets surround the peripheral surface of the shaft 8 along an arc of at least 200 degrees, preferably at least 270 degrees. In the embodiment of FIGS. 1 and 2, the group or row A is disposed between the rows B and C, and the width of each row, as considered in the circumferential direction of the shaft 8, is the same. The electromagnets 9 of the row A are nearest to the nip 5 of the rolls 1, 3, and the electromagnets 10, 11 of the rows B and C are remote from the nip 4 of the rolls 2 and 1. The exciting or energizing current for each electromagnet of the row A, B and/or C can be regulated independently of the adjustment of exciting current for the other electromagnets. This is desirable and advantageous because the attendant or an automatic regulating system is in a position to select the magnitude of the magnetic force furnished by each electromagnet independently of the other electromagnet or electromagnets. The electromagnets 9 of the row A can prevent deformation of the shell 7 under the action of the vertical force q. The electromagnets 10 of the row B can prevent deformation of the shell 7 under the action of the reaction force $q_r$. The electromagnets 10, 11 of the rows B and C can cooperate to counteract the forces tending to impart to the shell 7 an elliptical cross-sectional outline. Those changes in the shape of the cylindrical shell 7 which are attributable to or tend to develop under the action of the forces q(t) can be counteracted (reduced or eliminated) by periodic variations of the exciting currents for the electromagnets 9, 10 and/or 11 of the row A, B and/or C. The just described system compensates for the tendency of the shell 7 to undergo deformation by counteracting the forces which are a cause of deforming stresses as well as by stabilizing the shape of the shell so that the latter remains a true cylinder which is best suited to insure the application of predictable stresses to the running web 6 while successive increments of such web travel through the nip 4 and thereupon through the nip 5. The electromagnets 9, 10 and 11 of the rows A, B and C can insure predictable compression of successive increments of the web 6 in the nip 4 and/or 5 independently of eventual variations of the magnitude of the force q, $q_r$ and/or forces q(t).

FIG. 2 shows that the counterpressure roll 2 has two trunnions 12 rotatable in vertically movable bearings 13 which are installed in the frame of the calender. This enables the counterroll 2 to apply the force q to the peripheral surface of the shell 7 in the region of the nip 4 (as mentioned above, the force q includes the weight of the counterroll 2, and such weight can be applied to the shell 7 only if the counterroll 2 is movable up and down). The trunnions or end portions 14 of the shaft 8 are fixedly secured to the vertically movable bearings 15 by screws 16 or analogous fasteners. The purpose of vertical movability of the bearings 15 is to insure that the shell 7 can apply to the lower counterroll 3 a vertical force which includes the force q plus the weight of the shell 7 and eventually the force or forces generated by one or more electromagnets 9 of the row A.

FIG. 2 further shows certain electromagnets 9 and 11 of the respective rows A and C. The electromagnets 10 of the row B are not visible in FIG. 2. The neighboring electromagnets 9 and 11 are respectively separated from each other by supporting rings 17 on which the internal surface 18 of the shell 7 comes to rest (or against which the surface 18 abuts) when all of the electromagnets 9-11 are deenergized. When the calender including the rolls 1, 2 and 3 is in use, the shell 7 floats around the shaft 8, i.e., the parts 7 and 8 are not in contact with each other and the internal surface 18 is remote from the supporting rings 17.

The apparatus which is shown in FIGS. 1 and 2 further comprises a support 19 whose end portions are mounted in and are movable up and down with the bearings 15 for the trunnions 14 of the shaft 8. The support 19 carries several detectors or gauges 20 which transmit signals denoting the distance between such detectors and the nearest portion of the internal surface 18 of the floating shell 7. The detectors 20 are distributed around the periphery of the shaft 8, preferably as considered in the axial as well as in the circumferential direction of the shaft. It is particularly desirable to install detectors 20 between the electromagnets 9, 10 and 11 of the rows A, B and C on the one hand and the corresponding portions of the internal surface 18 of the shell 7 on the other hand. The support 19 carries the detectors 20 in such a way that their positions are independent of eventual deformation (such as flexing) of the shell 7, i.e., the detectors can furnish accurate measurements regardless of eventual deformation of the shell 7 in response to the action of the force q and/or $q_r$ the forces q(t). Also, the positioning of detectors 20 is not influenced by eventual deformation, such as flexing, of the shaft 8. As shown in FIG. 2, the support 19 is elongated and extends with clearance through radially inwardly extending slots or holes 17a of the supporting rings 17. Also, the support 19 is preferably installed in that (unoccupied) portion of the space between the peripheral surface of the shaft 8 and the internal surface 18 of the shell 7 which is disposed between the rows B and C, i.e., which is not taken up by the electromagnets 9-11. Such space is located above the shaft 8, i.e., close to the nip 4 of the rolls 1 and 2. If the shaft 8 is likely to be subjected to pronounced deforming (flexing) stresses, its trunnions 14 are preferably or can be mounted in spherical bearings so as to insure that the trunnions 14 do not interfere with flexing of the shaft.

The electromagnets 10 and 11 are mirror symmetrical to each other with reference to a vertical plane including the axis of the shaft 8, i.e., the plane of action of the force q. However, symmetrical distribution of all or nearly all electromagnets is not absolutely necessary. This depends on the intended use of the roll.

The distribution of electromagnets in such a way that their pole faces extend along an arc of approximately 270 degrees is preferred at this time because this renders it possible to properly counteract practically all deforming stresses as well as to stabilize the position of the shell 7 so that the entire shell floats and is out of contact with the shaft 8 when the roll 1 is in actual use.

It is further possible to form each of the three groups A, B and C of a single electromagnet which can extend along the full length of the shell 7. The structure which is shown in FIG. 2, i.e., wherein each of the electromagnet means consists of several aligned electromagnets 9, 10 or 11, is preferred at this time because it allows for more uniform distribution of magnetic forces. By providing a discrete regulating circuit for each electromagnet of a group or for smaller groups of electromagnets in each of the groups A, B and C, one can establish different magnetic forces, as considered in the axial direction of the shell 7. This renders it possible to accurately counteract deforming stresses which are applied to certain portions of the shell. The feature that each electromagnet preferably comprises at least two neighboring pole faces also contributes to more accurate application of magnetic forces. Thus, the pole faces allow for highly localized application of magnetic forces. It is not necessary to provide a magnetic feedback via other electromagnets. Each electromagnet is preferably provided with a U-shaped or E-shaped core.

Though it is possible to employ carriers which do not contitute or resemble shafts, it is presently preferred to utilize a shaft-like carrier for the shell 7 of the improved roll. The supporting rings 17 are non-rotatably affixed to the shaft 8, and each pair of neighboring rings 17 flanks one or more electromagnets in each of the three groups A, B and C. It will be noted that, by placing the electromagnets between the supporting rings 17, each electromagnet 9 can be aligned with an electromagnet 10 as well as with an electromagnet 11, as considered in the circumferential direction of the shaft 8. The rings 17 are placed onto the shaft 8 one after the other, and the mounting of each ring 17 is followed by the mounting of a set of three electromagnets 9, 10 and 11. This simplifies the assembly of the roll 1. If the electromagnets are to apply very pronounced magnetic forces, it is advisable to use a larger-diameter solid carrier whose peripheral surface is formed with recesses or grooves for reception of windings which constitute component parts of the electromagnets. If desired, each electromagnet can be separately secured to the carrier.

Figure 3:
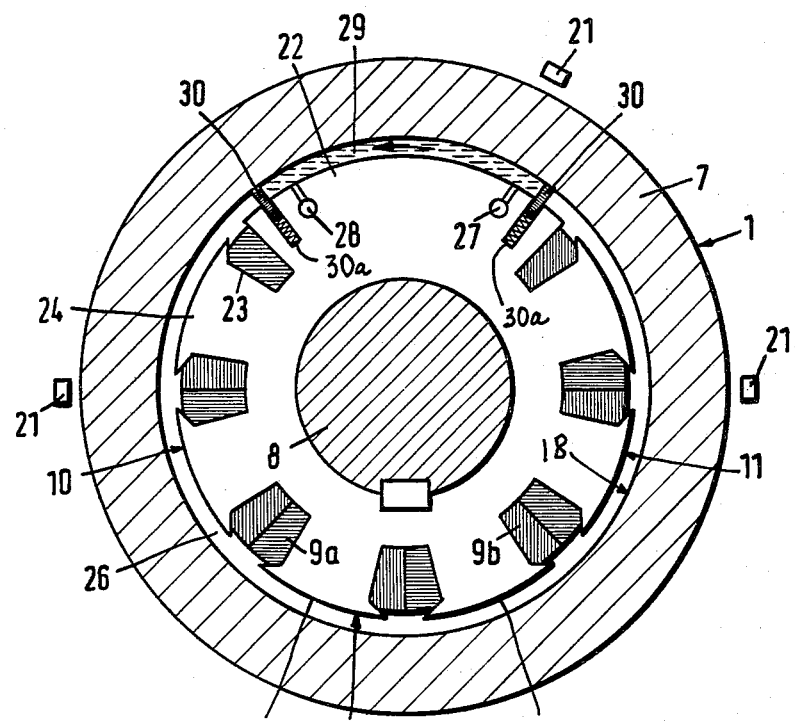
FIG. 3 is a schematic transverse sectional view of a second roll which cooperates with a single counterroll.

In the embodiment which is shown in FIG. 3, the shell 7 of the roll 1 spacedly surrounds an elongated carrier or shaft 8. The detectors 20 of FIG. 2 are replaced with detectors or gauges 21 which are installed outside of the roll 1, i.e., adjacent to but spaced apart from the external surface of the shell 7. Also, instead of resorting to discrete electromagnets (such as the electromagnets 9 and 11 shown in FIG. 2), the roll 1 of FIG. 3 comprises discs 22 which consist of magnetizable sheet material and have grooves 23 alternating with pole shoes 24. The windings of the electromagnets 9, 10, 11 shown in FIG. 3 are composite windings each of which includes two portions 9a and 9b. Each of these winding portions surrounds a pole so that each of the electromagnets 9-11 used in the roll 1 of FIG. 3 has two pole faces 25a, 25b. Such pole faces are separated from the internal surface 18 of the shell 7 by a cylindrical air gap 26.

FIG. 3 further shows that the discs 22 are formed with a pair of axially parallel channels 27, 28 which respectively serve for delivery and withdrawal of a liquid tempering agent, e.g., a heating fluid. The fluid fills the top portion 29 of the air gap 26 adjacent to the nip 4 (not shown) of the rolls 1 and 2 (the counterroll 2 is not illustrated in FIG. 3). The means for preventing the flow of tempering fluid from the portion 29 into the remaining larger portion of the air gap 26 includes two axially parallel barriers 30 which are received in radially extending grooves machined into the peripheries of the discs 22 and are urged outwardly against the internal surface 18 of the shell 7 by helical springs 30a or other suitable biasing means.

It normally suffices to introduce a tempering fluid only into that portion of the air gap 26 which is adjacent to the locus of application of pressure to a running web (it is assumed that the web runs between the topmost portion of the periphery of the shell 7 shown in FIG. 3 and a counterroll 2 thereabove). This simplifies the construction of the roll 1 and renders it possible to reduce the number of sealing means (barriers 30) to a minimum. It will be noted that the channels 27 and 28 are located between the two barriers 30. Portions of the barriers 30 may consist of elastic material so as to sealingly engage the internal surface 18 as well as the surfaces in the corresponding grooves of the shaft 8.

If the fluid in the uppermost portion 29 of the air gap 26 can be influenced by magnetic forces, the barriers 30 can be replaced with barriers which are established by magnetic fields. This also contributes to simplicity of the improved roll.

Figure 4:
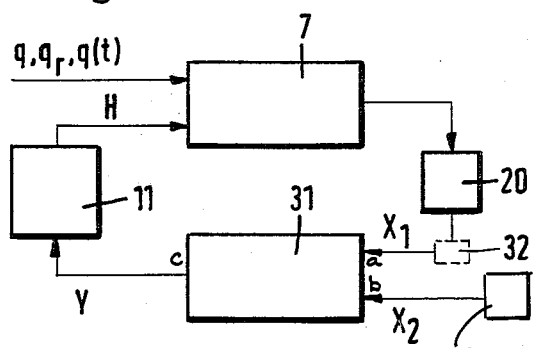
FIG. 4 is a circuit diagram of regulating means for one of the electromagnets in the roll of FIGS. 1-2 or FIG. 3.

Each group or row of electromagnets is associated with at least one regulating circuit. One such circuit is shown in FIG. 4. It is presently preferred to employ several regulating circuits for each group or row of electromagnets, for example, a discrete circuit for each electromagnet or a discrete circuit for each smaller group of (e.g., two or three) electromagnets.

The circuit of FIG. 4 comprises a control unit 31 having an input a for signals x1 from a detector 20 and an input b for reference signals x2 which are transmitted by a source 120 (e.g., an adjustable potentiometer). When the signal x1 deviates from the signal x2, the output c of the control unit 31 (e.g., a signal comparing stage) transmits a third signal y which changes the exciting current for an electromagnet, e.g., one of the electromagnets 11. The electromagnet 11 changes the force H which is applied to the shell 7, i.e., to that constituent of the roll 1 which is acted upon by the forces q(t) and/or by the forces q and $q_r$. The detector 20 ascertains the changed position of the shell 7 and transmits a modified signal x1. If the detector 20 is designed to respond to the pressure in (rather than to the position of) the shell 7, the connection between the output of such detector and the input a of the control unit 31 preferably contains a signal storing device 32 (indicated by broken lines).

If the detectors 20 are responsive to pressure, they are mounted on the shell 7. It has been found that three detectors normally suffice to guarantee a highly accurate monitoring of the position of the shell 7 with respect to the carrier or shaft 8. However, it is even more desirable to provide a relatively large number of detectors which are distributed about the circumference of the shell 7 and/or shaft 8. In accordance with a presently preferred embodiment of the invention which is shown in FIG. 2, the detectors 20 are disposed in groups, and each group is located in a plane which is normal to the axis of the shaft 8. The planes are spaced apart from each other, as considered in the axial direction of the shaft 8. Such distribution of detectors 20, plus the provision of an equal number of discrete regulating means for individual electromagnets or smaller groups of electromagnets, renders it possible to regulate the magnitude of magnetic forces with a surprisingly high degree of accuracy, as considered in the axial or circumferential direction of the shell 7.

The detectors are placed into the interior of the shell 7 if the space around the shell must remain free, e.g., for the transport of a web of paper, textile material or the like.

If the detector 20 of FIG. 4 monitors the pressure, it is not only affixed to the shell 7 but is operatively connected with the storing device 32 in such a way that the latter stores signals denoting the maximum value of the amplitude. One can obtain a proper signal for continuous regulation of magnetic forces in spite of the fact that the pressure-responsive detector shares the angular movements of the shell 7.

Figure 5:
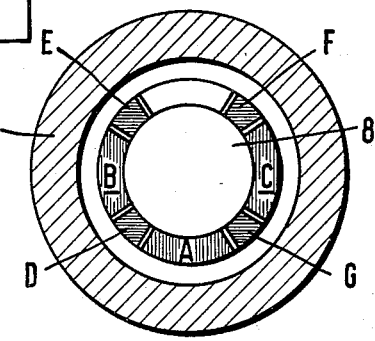
FIG. 5 is a schematic transverse sectional view of a third roll.

In order to counteract radial vibrations of the shell 7, the regulating means for several electromagnets which are spaced apart from each other in the circumferential direction of the shaft 8 can be assembled in such a way that a phase shift is established from electromagnet to electromagnet. Such regulating means monitors the frequency of radial vibrations and invariably produces adequate damping magnetic forces. This is shown in FIG. 5. The additional groups D, E, F and G of electromagnets which are used in the roll of FIG. 5 are mirror symmetrical to each other with reference to the plane of the force q. Thus, the additional groups D and E are disposed at one side of such plane and are mirror symmetrical to the groups F and G which are disposed at the other side of the plane. The electromagnets of the groups D, E, F and G allow for elimination of vibration independently of the stabilizing and deformation-resisting or preventing action of electromagnets 9, 10 and 11 in the groups A to C.

In the embodiment of FIG. 5, the shaft 8 for the shell 7 carries the aforediscussed groups or rows A, B, C of electromagnets plus the four additional groups or rows D, E, F, G, each of which comprises several electromagnets. The electromagnets of the groups or rows D–G are regulated by a circuit which can ascertain the amplitude of vibrations and supplies a periodically varying exciting current to compensate for those forces which cause the shell 7 to vibrate. It is desirable to regulate the electromagnets of the groups or rows D–G in a sense to reduce or eliminate the vibrations of the shell 7. All that is necessary is to provide a control unit 31 which operates with an appropriate phase shift from electromagnet to electromagnet and/or from group to group.

Figure 6:
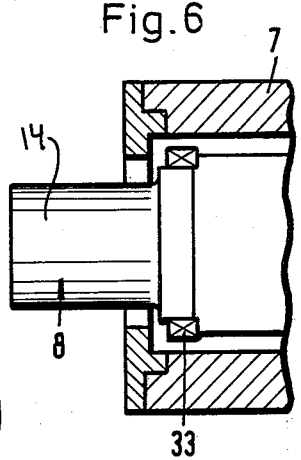
FIG. 6 is a fragmentary schematic axial sectional view of a fourth roll.

FIG. 6 shows that the supporting rings 17 of the roll which is shown in FIG. 2 can be replaced with so-called emergency rollers 33 which support the shell 7 when the electromagnets (not shown) are deenergized. The rollers 33 are or may constitute antifriction bearings mounted on the trunnions 14 and extending radially beyond the peripheral surface of the shaft 8.

The rollers 33 are functional equivalents of the two outermost supporting rings 17 of FIG. 2. The arrangement of FIG. 2 is preferred at this time because the shell 7 can come to rest on a relatively large number of annular supporting elements, i.e., on three or more rings 17 which support not only the end portions but also one or more intermediate portions of the internal surface 18. This is important when the electromagnets are deenergized so that the shell 7 tends to descend by gravity and/or under the action of forces which are transmitted by the roll or rolls thereabove.

Figure 7:
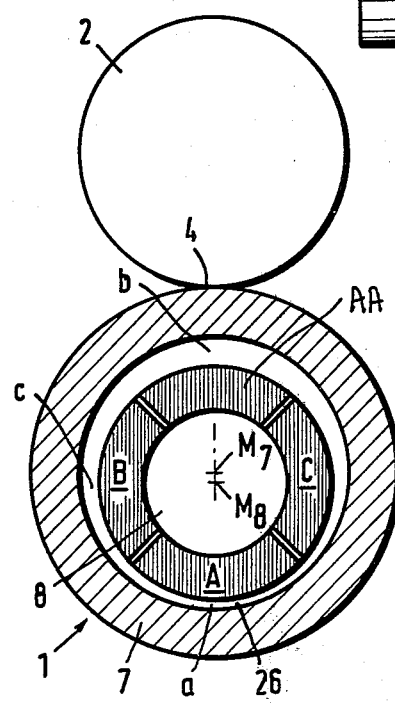
FIG. 7 is a schematic transverse sectional view of a fifth roll which cooperates with a counterroll.

FIG. 7 illustrates a roll 1 and a counterroll 2 which is located above and bears against the roll 1, namely, against the peripheral surface of the sleeve or shell 7 forming part of the roll 1. The shell 7 is shown in the operative position. It will be noted that the width of the air gap 26 is less at a than at b. Thus, the axis $M_7$ of the shell 7 does not coincide with but is only parallel to the axis $M_8$ of the shaft 8. Therefore, the width of the air gap 26 varies gradually from a minimum value (at a) toward a maximum value (at b). The transition zones are indicated at c. An advantage of the structure which is shown in FIG. 7 is that the narrow portion a of the air gap 26 allows for the transmission of substantial magnetic forces to the shell 7 and the application of very pronounced pressure to the material in the nip 4. If the width of the gap (at the nip 4) between the rolls 1 and 2 is to be increased, owing to a defect in the material of the running web, the exciting current for the electromagnets of the row A is reduced to such an extent that the axis $M_7$ moves downwardly and coincides with the axis $M_8$ of the shaft 8. The width of the resulting gap between the rolls 1 and 2 is then $(b-a)/2$. Such movement of the shell 7 away from the peripheral surface of the counterroll 2 can be effected very rapidly because it is assisted by the weight of the shell 7 (which tends to move downwardly) as well as by the forces which are applied by the electromagnets of the rows B and C. These electromagnets have the tendency of establishing a gap of constant width adjacent to their respective pole faces. Moreover, the movement of the shell 7 away from the counterroll 2 can be effected very rapidly on the additional ground that there is no danger of collision with a roll below the roll 1 in response to downward movement of the shell 7 beyond the position of coaxiality with the shaft 8. Note that there is no counterroll below the shell 7.

Figure 8:
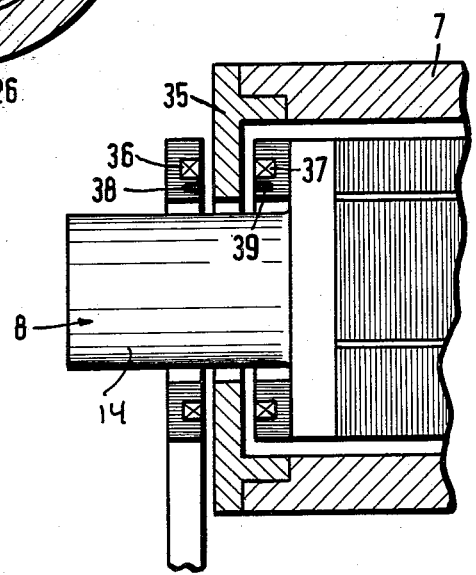
FIG. 8 is a fragmentary axial sectional view of a sixth roll.

The roll which is shown in FIG. 8 comprises means for stabilizing the position of the shell 7 in the axial direction of the shaft 8. To this end, the end portions of the shell 7 carry inwardly extending annular flanges 35 (only one shown) each of which is flanked by two ring-shaped electromagnets 36, 37. The electromagnet 37 is mounted on the respective trunnion 14 immediately adjacent to the larger-diameter central portion of the shaft 8, and the electromagnet 36 is mounted on the trunnion 14 at the outer side of the flange 35. Detectors 38 and 39 on the electromagnets 36, 37 transmit signals which denote the distance between the flange 35 and the respective electromagnets, and such signals are processed by an appropriate regulating circuit which is analogous to the circuit of FIG. 4 and serves to maintain the flange 35 midway or substantially midway between the electromagnets 36 and 37. This insures that the shell 7 is held in or immediately returns to an optimum axial position.

A single flange 35 (in combination with the electromagnets 36, 37) often suffices to insure that the shell 7 is held in an optimum axial position.

It is frequently desirable and advantageous to place electromagnets all around the shaft 8 for the floating sleeve or shell 7 of the roll 1. This is advisable when the forces due to the weight of the rolls and the forces which are applied to urge the rolls against each other (refer to the previously discussed forces which are generated by hydraulic or pneumatic means to urge the counterroll 2 of FIG. 1 against the shell 7 of the roll 1) do not act in the same direction. Also additional electromagnets between the rows B and C opposite the row A are often desirable or necessary in the embodiment of FIG. 7 in order to effect rapid separation of the shell 7 from the peripheral surface of the counterroll 2. This can be achieved by installing an additional set or group or row of electromagnets diametrically opposite the row A (in FIG. 7, such additional row of electromagnets is indicated at AA). Also, the roll 1 of FIG. 7 can embody the rows D, E, F, G of FIG. 5 in order to achieve more rapid centering of the shell 7 with reference to the shaft 8 when it becomes necessary to provide a gap between the shell 7 and the counterroll 2 thereabove.

The detectors 20, 21, 38 and/or 39 may be of any suitable size, shape and/or type. It is presently preferred to employ contact-free proximity switches or detectors in the form of photocells or other optical systems which can accurately determine the distance between the shell 7 and the shaft 8, either directly (by being installed between the parts 7 and 8) or indirectly (by being located outside of the shell 7).

The exact design of the electromagnets and of the regulating circuits therefor forms no part of the present invention. Such components of the improved roll are similar or analogous to those which are utilized in the field of vehicles whose operation is based on magnetically induced floating effect.

An important advantage of the feature that the pole faces of electromagnets in the groups or rows A-C extend along an arc of at least 200 degrees and preferably along an arc of approximately 270 degrees, as considered in the circumferential direction of the shaft 8, and that the electromagnets form at least three groups or rows, is that this enables the attendant or an automatic regulating system to apply magnetic forces not only in the main direction of stress upon the shell 7 (see the force q) but also in any other direction in which the magnetic forces should be applied in order to reduce the likelihood of deformation and/or undue shifting of the shell 7. Thus, the electromagnets, 10, 11 of the groups B and C can oppose forces which act in a horizontal plane (such as the reaction force $q_r$). In fact, by appropriate selection of the angular position of groups of electromagnets, the designer of the improved roll can select any desired direction of action of the forces which develop in response to energization of one or more electromagnets in a given row. Since the electromagnets 9, 10 and/or 11 can be energized to the desired extent independently of each other, it is possible to counteract the forces which tend to deform the shell 7 and/or to counteract those forces which tend to change the position of the shell, be it radially, axially and/or radially as well as axially. Moreover, the distribution of groups or rows A-C (and, if necessary AA and/or D-G) in the circumferential direction of the carrier 8 renders it possible to effectively counteract forces which develop periodically and whose magnitude fluctuates within a wide range (such forces include the forces shown at q(t). The vibratory forces which are or can be counteracted by magnetic forces can act in any direction and may be active only at the exterior of the shell 7.

Another important advantage of the improved roll is that the stabilization of the position and/or resistance to deformation of the shell 7 can be achieved in a simple and space-saving manner. This is in contrast to the construction of rolls which employ the aforediscussed hydrostatic damping devices wherein cushions of fluid must be confined by resorting to complex sealing devices. Furthermore, and since the forces which are generated by the electromagnets tend to pull the nearest portion or portions of the shell, the electromagnets can be readily installed in the interior of the shell. This includes those electromagnets which oppose deformations of the cross-sectional outline of the shell.

It is also within the purview of the invention to install the end portions of the shell 7 in mechanical bearings and to utilize the electromagnets solely as a means for controlling the position and/or for preventing undue deformation of the median portion of the shell. However, the structure which is shown in the drawing is preferred at this time, i.e., it is presently preferred to use electromagnets which enable the shell 7 to float all the way from the one to the other end face. This renders it possible to influence the shape of the entire shell by magnetic forces, i.e., one can completely eliminate any and all mechanical forces which develop when the end portions of the shell are mounted in mechanical bearings. Still further, such mounting of the shell 7 that it can float in its entirety renders it possible to move the entire shell radially toward or away from a counterroll.

As explained in connection with FIG. 7, the maximum width of the gap in the region of the nip 4 is $(b-a)/2$, i.e., less than the minimum width of the air gap 26. This is desirable because it allows for rapid separation of the shell 7 from the counterroll 2 by the simple expedient of changing the condition of certain electromagnets. Thus, the gap between the shell 7 and the counterroll 2 can be increased from zero to a maximum value by the simple expedient of deenergizing the electromagnets 9 of the group A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspect of our contribution to the art and, therefore, such adaptations should and are intended to be comprehended within the meaning and range of equivalence of the appended claims.

We claim:

1. In a calendar or the like, a roll comprising a nonrotatable elongated carrier; a rotary cylindrical shell spacedly surrounding said carrier and consisting at least in part of magnetizable material; and means for causing said shell to float about said carrier, including at least three groups of electromagnet means mounted on said carrier within the confines of said shell and having pole faces extending along an arc of at least 200 degrees, as considered in the circumferential direction of said carrier, and means for regulating the extent of energization of each of said electromagnet means independently of other electromagnet means.

2. The structure of claim 1, wherein said magnitizable material forms at least one layer of said shell, as considered in the circumferential direction of the shell.

3. The structure of claim 1, wherein said pole faces and said shell define an air gap in energized condition of said electromagnet means.

4. The structure of claim 1, wherein at least one of said groups extends substantially all the way between the axial ends of said shell.

5. The structure of claim 1, wherein said shell has an internal surface and said electromagnet means define with said internal surface an air gap of predetermined width, as considered in the radial direction of said shell, and further comprising a counterroll adjacent to and normally exerting pressure against the periphery of said shell, said shell being parallel to said counterroll and being movable sideways relative to said counterroll through a distance which is less than the maximum width of said air gap.

6. The structure of claim 1, wherein said carrier includes a shaft and the axes of said shaft and said shell are parallel to each other in energized condition of said electromagnet means but coincide with each other in deenergized condition of said electromagnet means.

7. The structure of claim 6, further comprising a counterroll parallel with and immediately adjacent to said shell in energized condition of said electromagnet means.

8. The structure of claim 1, wherein said angle at least approximates 270 degrees.

9. The structure of claim 1, further comprising means for applying to said shell pressure in a predetermined plane and said electromagnet means include a first and a second set of electromagnets which are mirror symmetrical to each other with reference to said plane.

10. The structure of claim 1, wherein each of said groups comprises a row consisting of several discrete electromagnets and such rows are substantially parallel to the axis of said shell.

11. The structure of claim 10, wherein said regulating means comprises a discrete control unit for regulating the exciting current for each of said electromagnets.

12. The structure of claim 10, wherein said regulating means comprises several control units at least some of which regulate the exciting current for at least two electromagnets.

13. The structure of claim 1, wherein each of said electromagnet means comprises at least one electromagnet having at least two neighboring pole faces.

14. The structure of claim 1, wherein said carrier includes a shaft and said means for causing said shell to float further comprises disc-shaped supports of magnetizable material surrounding said shaft and having peripheral surfaces with grooves, said electromagnet means having windings extending into said grooves.

15. The structure of claim 14, wherein said supports are non-rotatably secured to said shaft.

16. The structure of claim 1, wherein said regulating means includes at least one detector operative to monitor the position of said shell relative to said carrier and to transmit first signals denoting the monitored position, a source of reference signals denoting the desired position of said shell with respect to said carrier, and means for generating third signals to said electromagnet means when the characteristics of said first signals deviate from the characteristics of said reference signals.

17. The structure of claim 16, wherein said regulating means includes a plurality of detectors, at least one for each of said electromagnet means, a discrete source of reference signals for each of said detectors, and discrete means for generating third signals for each of said electromagnet means.

18. The structure of claim 16, wherein said regulating means includes a plurality of detectors which are spaced apart from each other, as considered in the circumferential direction of said shell.

19. The structure of claim 18, wherein said detectors are disposed in several planes which are substantially normal to the axis of said shell.

20. The structure of claim 16, wherein said regulating means comprises a plurality of detectors which are disposed in the interior of said shell.

21. The structure of claim 20, further comprises means for supporting said detectors independently of said carrier and said shell.

22. The structure of claim 16, wherein said detector is secured to said shell and is responsive to pressure, and further comprising signal storing means connected between said detector and said means for generating said third signals.

23. The structure of claim 1, wherein said shell is subjected to the action of forces tending to impart thereto radial vibratory movements and said regulating means includes means for energizing at least one electromagnet means of at least two of said groups with phase shift so as to oppose such vibratory movements of said shell.

24. The structure of claim 1, wherein said shell is subjected to the action of forces tending to impart thereto radial vibratory movements and further comprising additional groups of electromagnet means on said carrier and means for energizing the electromagnet means of said additional groups so as to counteract the tendency of said shell to perform said vibratory movements.

25. The structure of claim 24, wherein said additional groups are mirror symmetrical to each other with reference to a plane including the axis of said carrier.

26. The structure of claim 1, further comprising emergency roller means provided on said carrier and supporting said shell in deenergized condition of said electromagnet means.

27. The structure of claim 1, further comprising rings provided on said carrier and supporting said shell in deenergized condition of said electromagnet means.

28. The structure of claim 1, further comprising a plurality of ring-shaped supporting means provided on said carrier and arranged to support said shell in deenergized condition of said electromagnet means, said electromagnet means being disposed, at least in part, between said supporting means.

29. The structure of claim 1, further comprising an inwardly extending flange provided at one axial end of said shell and extending toward but short of said carrier, and a pair of additional electromagnets flanking said flange and being energizable to thereby maintain said shell in a predetermined axial position.

30. The structure of claim 29, further comprising detector means for monitoring the distance between said flange and at least one of said additional electromagnet means and for generating signals for adjustment of the axial position of said shell when the distance between said one additional electromagnet means and said flange is outside of a predetermined range.

31. The structure of claim 1, wherein said electromagnet means and said carrier on the one hand, and said shell on the other hand, define an air gap which is surrounded by said shell, and further comprising a supply of fluid tempering agent filling a portion of said air gap.

32. The structure of claim 31, wherein said carrier has channel means for admission of said fluid to and for evacuation of said fluid from said portion of said air gap.

33. The structure of claim 32, further comprising spring-biased barriers provided on said carrier and confining the fluid in said portion of said air gap.

34. The structure of claim 33, wherein said channels are substantially parallel to the axis of said shell and are disposed between said barriers, as considered in the circumferential direction of said shell.

35. The structure of claim 31, wherein said tempering agent can be influenced by magnetic forces and further comprising means for establishing magnetic fields constituting barriers for confining the fluid tempering agent in said portion of said air gap.

* * * * *